US011830289B2

(12) United States Patent
Yellepeddi et al.

(10) Patent No.: US 11,830,289 B2
(45) Date of Patent: Nov. 28, 2023

(54) MULTI-MODAL FAR FIELD USER INTERFACES AND VISION-ASSISTED AUDIO PROCESSING

(71) Applicant: Analog Devices, Inc., Norwood, MA (US)

(72) Inventors: Atulya Yellepeddi, North Reading, MA (US); Kaushal Sanghai, Brighton, MA (US); John Robert McCarty, Arlington, MA (US); Brian C. Donnelly, Sudbury, MA (US); Nicolas Le Dortz, Cambridge, MA (US); Johannes Traa, Boston, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 436 days.

(21) Appl. No.: 16/898,721

(22) Filed: Jun. 11, 2020

(65) Prior Publication Data

US 2020/0302159 A1    Sep. 24, 2020

Related U.S. Application Data

(63) Continuation of application No. PCT/US2018/059336, filed on Nov. 6, 2018.
(Continued)

(51) Int. Cl.
*G06V 40/16*         (2022.01)
*G06T 7/70*          (2017.01)
*H04S 7/00*          (2006.01)

(52) U.S. Cl.
CPC .............. *G06V 40/172* (2022.01); *G06T 7/70* (2017.01); *H04S 7/30* (2013.01);
(Continued)

(58) Field of Classification Search
CPC .......... G06K 9/00288; G06K 9/00295; G06K 9/00228; G06K 9/0057; G06K 9/0061;
(Continued)

(56) References Cited

U.S. PATENT DOCUMENTS

2004/0216049 A1    10/2004    Lewis et al.
2005/0259006 A1    11/2005    Kim et al.
(Continued)

FOREIGN PATENT DOCUMENTS

CN    1449558      10/2003
CN    105957521    9/2016
(Continued)

OTHER PUBLICATIONS

International Search Report and Written Opinion issued in PCT Patent Application Serial No. PCT/US2019/059336 dated Mar. 20, 2019, 29 pages.
(Continued)

*Primary Examiner* — Wesley J Tucker
(74) *Attorney, Agent, or Firm* — ArentFox Schiff LLP

(57) ABSTRACT

Far field devices typically rely on audio only for enabling user interaction and involve only audio processing. Adding a vision-based modality can greatly improve the user interface of far field devices to make them more natural to the user. For instance, users can look at the device to interact with it rather than having to repeatedly utter a wakeword. Vision can also be used to assist audio processing, such as to improve the beamformer. For instance, vision can be used for direction of arrival estimation. Combining vision and audio can greatly enhance the user interface and performance of far field devices.

12 Claims, 15 Drawing Sheets

Related U.S. Application Data

(60) Provisional application No. 62/597,043, filed on Dec. 11, 2017.

(52) U.S. Cl.
CPC ............... *G06T 2207/10016* (2013.01); *G06T 2207/30201* (2013.01); *G06T 2210/12* (2013.01)

(58) Field of Classification Search
CPC ............ G06T 7/70; G06T 2207/10016; G06T 2207/30201; G06T 2210/12; H04S 7/30; H04R 2201/401; H04R 2420/07; H04R 2430/23; H04R 3/005; H04R 29/005; Y02D 10/00; G06F 1/1684; G06F 1/1686; G06F 1/3231; G06F 3/167
See application file for complete search history.

(56) References Cited

U.S. PATENT DOCUMENTS

| | | | |
|---|---|---|---|
| 2011/0317006 | A1 | 12/2011 | Kuboyama et al. |
| 2012/0169582 | A1 | 7/2012 | Tschirhart |
| 2012/0295708 | A1* | 11/2012 | Hernandez-Abrego ..................... A63F 13/10 463/36 |
| 2015/0130716 | A1 | 5/2015 | Sridharan et al. |
| 2016/0140405 | A1* | 5/2016 | Graumann ............. G06V 40/40 382/118 |
| 2016/0189733 | A1 | 6/2016 | Vasilieff et al. |
| 2017/0068863 | A1* | 3/2017 | Rattner .................. G06V 40/10 |
| 2018/0203506 | A1 | 7/2018 | Ben-Hamadou |
| 2019/0050629 | A1* | 2/2019 | Olgiati ...................... G06T 7/20 |
| 2019/0289359 | A1* | 9/2019 | Sekar ................. H04N 21/4333 |
| 2020/0089962 | A1* | 3/2020 | Narang ................... G06T 11/20 |
| 2020/0104570 | A1* | 4/2020 | Kumar ................. G06V 10/143 |
| 2020/0309930 | A1* | 10/2020 | Zhou .................... G06V 40/172 |
| 2020/0380279 | A1* | 12/2020 | Yang ..................... G06N 3/0454 |
| 2022/0093101 | A1* | 3/2022 | Krishnan ................ G10L 15/20 |

FOREIGN PATENT DOCUMENTS

| | | |
|---|---|---|
| CN | 106203052 | 12/2016 |
| CN | 107548483 | 1/2018 |
| EP | 2806335 | 11/2014 |
| KR | 10-2010-0041061 | 4/2010 |
| KR | 10-2016-0103225 | 9/2016 |
| WO | 2013/137900 | 9/2013 |
| WO | 2015/088141 | 6/2015 |

OTHER PUBLICATIONS

Prodanov, *Error Handling in Multimodal Voice-Enabled Interfaces of Tour-Guide Robots Using Graphical Models*, 2006, 200 pages.
Verma et al., *Face Detection and Tracking in a Video by Propagating Detection Probabilities*, IEEE Transactions on Pattern Analysis and Machine Intelligence, vol. 25, Sep. 29, 2003, 14 pages.
Otsuka et al., *A Realtime Multimodal System for Analyzing Group Meetings by Combining Face Pose Tracking and Speaker Diarization*, Proceedings of the 10th International Conference on Multimodel, Jan. 2008, 8 pages.
Goldhammer et al., *Pedestrian's Trajectory Forecast in Public Traffic with Artificial Neural Networks*, International Conference on Pattern Recognition, IEEE Computer Society, Aug. 24, 2014, Abstract only, 2 pages.
English Patent Translation of Bibliographic Data, Description and Claims of KR10-2010-0041061.
English Patent Translation of Bibliographic Data, Description and Claims of KR10-2016-0103225.
CS&E—JP Peer Contribution, Feb. 8, 2019, 15 pages.
CS&E—CN Peer Contribution, Feb. 13, 2019, 11 pages.
Cinbis et al., *Unsupervised Metric Learning for Face Identification in TV Video*, International Conference on Computer Vision, Nov. 2011, Barcelona Spain, IEEE © 2011, 9 pages.
CS&E—EP Peer Contribution—Feb. 19, 2020, 13 pages.
English Patent Translation of Bibliographic Data, Description and Claims of CN105957521, 13 pages (see 10 above).
English Patent Translation of Bibliographic Data, Description and Claims of CN106203052, 22 pages (see 12 above).
Ozerov et al., *On Evaluating Face Tracks in Movies*, HAL archives—ouvertes, IEEE International Conference on Image Processing (ICIP 2013), Sep. 2013, Melbourne, Australia, 6 pages.
CS&E—US Peer Contribution, Jan. 25, 2019, 10 pages.

* cited by examiner

MULTI-MODAL FAR FIELD USER INTERFACES AND VISION-ASSISTED AUDIO PROCESSING

PRIORITY DATA AND RELATED APPLICATION(S)

This patent application is a bypass continuation of International Patent Application No. PCT/US2018/059336, entitled MULTI-MODAL FAR FIELD USER INTERFACES AND VISION-ASSISTED AUDIO PROCESSING, filed on Nov. 6, 2018. The International Patent Application claims priority to and receives benefit from U.S. Provisional Application No. 62/597,043, entitled MULTI-MODAL FAR FIELD USER INTERFACES AND VISION-ASSISTED AUDIO PROCESSING, filed on Dec. 11, 2017. Both the International Patent Application and the US Provisional Application are incorporated by reference in its entirety.

TECHNICAL FIELD OF THE DISCLOSURE

The present invention relates to the field of electronics, in particular to electronics implementing multi-modal far field user interfaces.

BACKGROUND

Far field devices are becoming increasingly common in the household, or environment where users are present. These far field devices are considered "far field" because users can interface or interact with the devices without having to be right next to the device. For instance, these far field devices can provide a voice-controlled user interface to allow users to speak to the device. Examples of far field devices on the market is the Amazon Echo, Google Home, etc. These far field devices can be equipped with sensors (e.g., microphones, cameras, light sensor, motion sensor, temperature sensor, etc.), and processors and/or electronic circuits which can perform computations relating to signal processing (e.g., video processing, audio processing, artificial intelligence algorithms, and provide capabilities for communicating with a communication network (e.g., the Internet, near field device communication networks, wireless networks, etc.).

The far field devices can provide useful features to users. Users can have a conversation with a virtual assistant through the far field device. The far field device can assess information and retrieve relevant information as requested by the user. The far field device can assist in purchasing items from the Internet. The far field device can help implement smart home operations (e.g., make toast, turn off the television, unlock the front door, etc.). The ability to provide the useful features to the users can depend greatly on how well the user can use his/her voice to interact with the far field device.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Far field devices typically rely on audio only for enabling user interaction and involve only audio processing. Adding a vision-based modality can greatly improve the user interface of far field devices to make them more natural to the user. For instance, users can look at the device to interact with it rather than having to repeatedly utter a wakeword. Vision can also be used to assist audio processing, such as to improve the beamformer. For instance, vision can be used for direction of arrival estimation. Combining vision and audio can greatly enhance the user interface and performance of far field devices.

Far Field Devices

Figure 1:
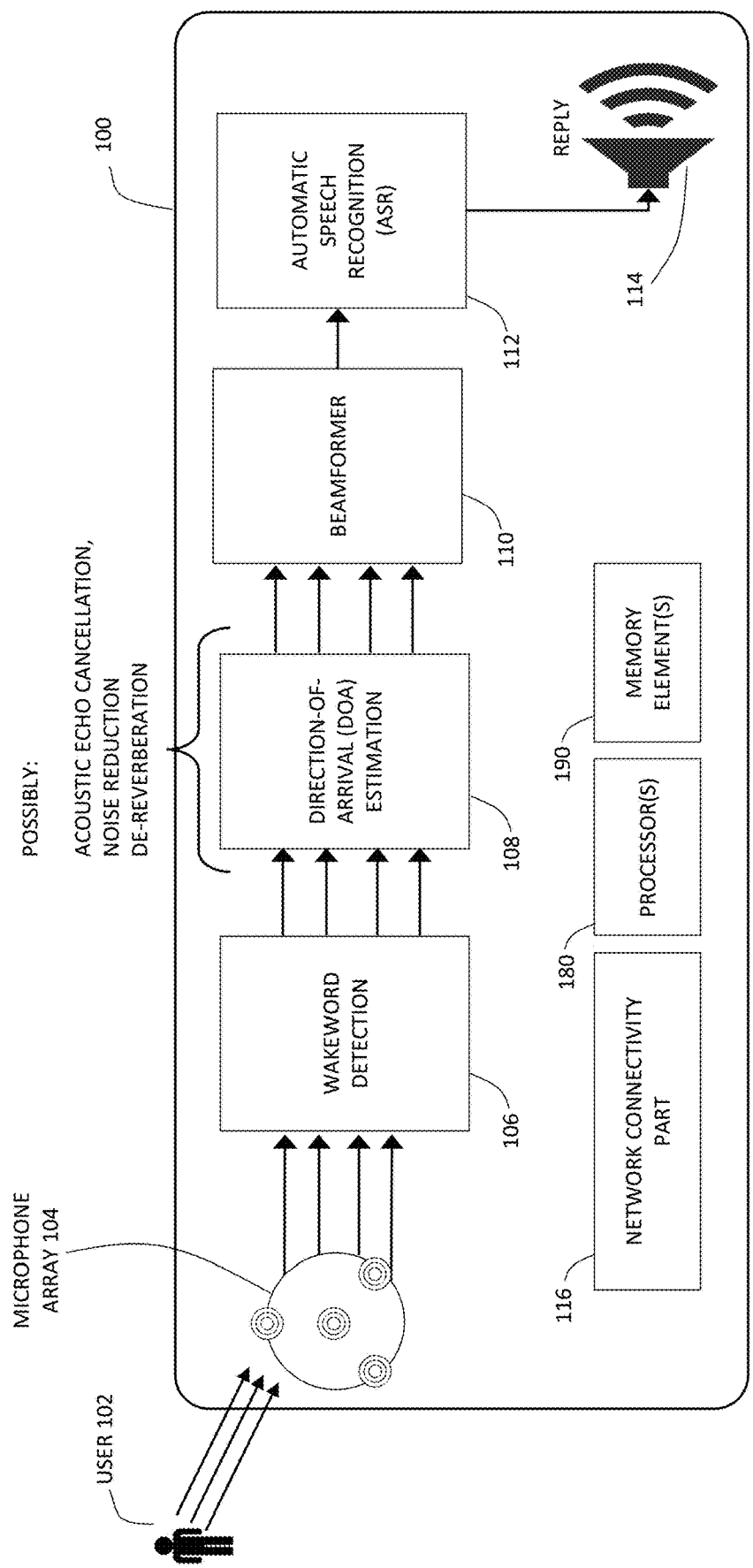
FIG. 1 illustrates functions associated with a far field device, according to some embodiments of the disclosure.

FIG. 1 illustrates functions associated with a far field device 100. An exemplary user 102 is shown, and the user can interact with the far field device 100. The far field device can include a microphone array 104 comprising a plurality of microphones, a wakeword detection part 106, a direction of arrival (DOA) estimation part 108, a beamformer 110, and automatic speech recognition (ASR) part 112, and an output 114 for outputting audio back to the user. The far field device 100 can include a network connectivity part 116 for wired and/or wireless connection to a network to communicate with other devices remote to the far field devices.

The microphone array 104 can listen to the environment and generate audio signal streams for processing by the far field device 100. The wakeword detection part 106 can process the audio signal stream(s) and detect whether the wakeword was present in the audio signal stream(s). The wakeword detection part 106 can perform wakeword detection continuously (e.g., ambient sensing) without consuming a lot of power. The (audio-based) DOA estimation part 108 can detect a direction of an audio source (e.g., a user). In addition to the DOA estimation part 108, the functions associated with the far field device can include other functions in the pipeline, such as acoustic echo cancellation, noise reduction/cancellation, de-reverberation, etc. The beamformer 110 can form a beam with the microphone array 104 (e.g., based on the DOA) to increase the audio response of the microphone array in the direction of the audio source, and/or decrease the audio response of the microphone array in the direction of noise (or other unwanted audio sources). The beamformer 110 can combine the audio stream(s) in a way to coherently increase the audio coming from one direction while attenuating the audio coming from other directions. The ASR part 112 can process a part of the audio stream(s) to recognize/detect speech such as commands. Furthermore, a response or reply can be generated or synthesized in response to the recognized/detected speech.

Depending on the implementation of far field device 100, the set of functions may vary. For instance, functionality associated with the ASR part 112 can be implemented remotely (e.g., implemented in the cloud). Far field device 100 can include speech synthesis (not shown) locally or the functionality associated with speech synthesis can be implemented remotely. The output 114 can include a speaker for audio output. In some cases, the output 114 can include a display outputting visual output.

The far field device 100 can further include one or more processors 180 (e.g., including processors to execute instructions and/or dedicated/specialized digital hardware) and one or more memory elements 190 (e.g., one or more computer-readable media) to store data and/or instructions executable by the one or more processors 180.

Multi-Modal User Interfaces for Far Field Devices

The voice-controlled user interfaces of far field devices can be unnatural since users are often required to say a fixed "wakeword" to wake up the device, or to begin interacting with the device. A "wakeword" has to be repeated if the user wishes to continue the interaction. The use of a fixed wakeword is atypical for human speech and interaction. One solution to this issue is to integrate one or more other modalities (outside of audio/voice) to enhance the user interaction in unique ways. For example, voice (or audio) modality can be augmented with vision. Specifically, the far field device can take advantage of vision cues to help determine whether a user intended to interact with the far field device. In another example, vision can replace the voice modality (i.e., the wakeword mechanism), and allow the user to initiate an interaction with the far field device by looking at the device for a predetermined amount of time (e.g., a couple of seconds or more). In another example, a user can say the wakeword once, and the device can (subsequently) track the user through vision. Subsequent user interactions can be initiated by looking at the device for a predetermined amount of time without having to say the wakeword again.

By leveraging vision (or visual cues), the user interaction can be made more natural to the user. A user looking at the device for a predetermined amount of time can be detected by the device as user attention. Detecting user attention can assist in making the user interaction more natural, since a user would naturally would convey attention by looking at another person or object, and not by announcing a wakeword each time the user utters a remark or sentence. By integrating another modality like vision, it is possible to create a more human-like user interaction with the far field devices.

Far field user interaction can pose its own set of challenges. Typical vision-based user interactions require the user to be next to the device and directly facing the device. For a cell phone, some vision-based user interactions require the user to be directly staring at the device about a foot or so away. Far field devices pose a greater challenge for system designers because the environment in which far field devices are used are larger, more unpredictable, and more dynamic, than near field devices. Providing a natural user interface and processing audio effectively are not trivial for far field devices. The mechanisms for detecting visual cues, e.g., attention, when a user is farther away (e.g., a few feet or more away) can be drastically different from the mechanisms used for typical vision-based mechanisms.

To implement far field vision-based user interfaces, one or more cameras can be provided to the far field device, e.g., in the same or sharing the same "field-of-view" as microphone array. The field-of-view of the microphone array can be a hemisphere (upper hemisphere or hemisphere in front of the device). The one or more cameras can be a wide angle view camera with sufficient resolution. The one or more cameras can include one or more of the following: a 2D color or black and white (B/W) camera (e.g., with a wide angle lens), a depth camera (providing 3D and/or depth information), a time-of-flight camera, an infrared camera (for operating in low light conditions, nighttime conditions), etc.

Figure 2:
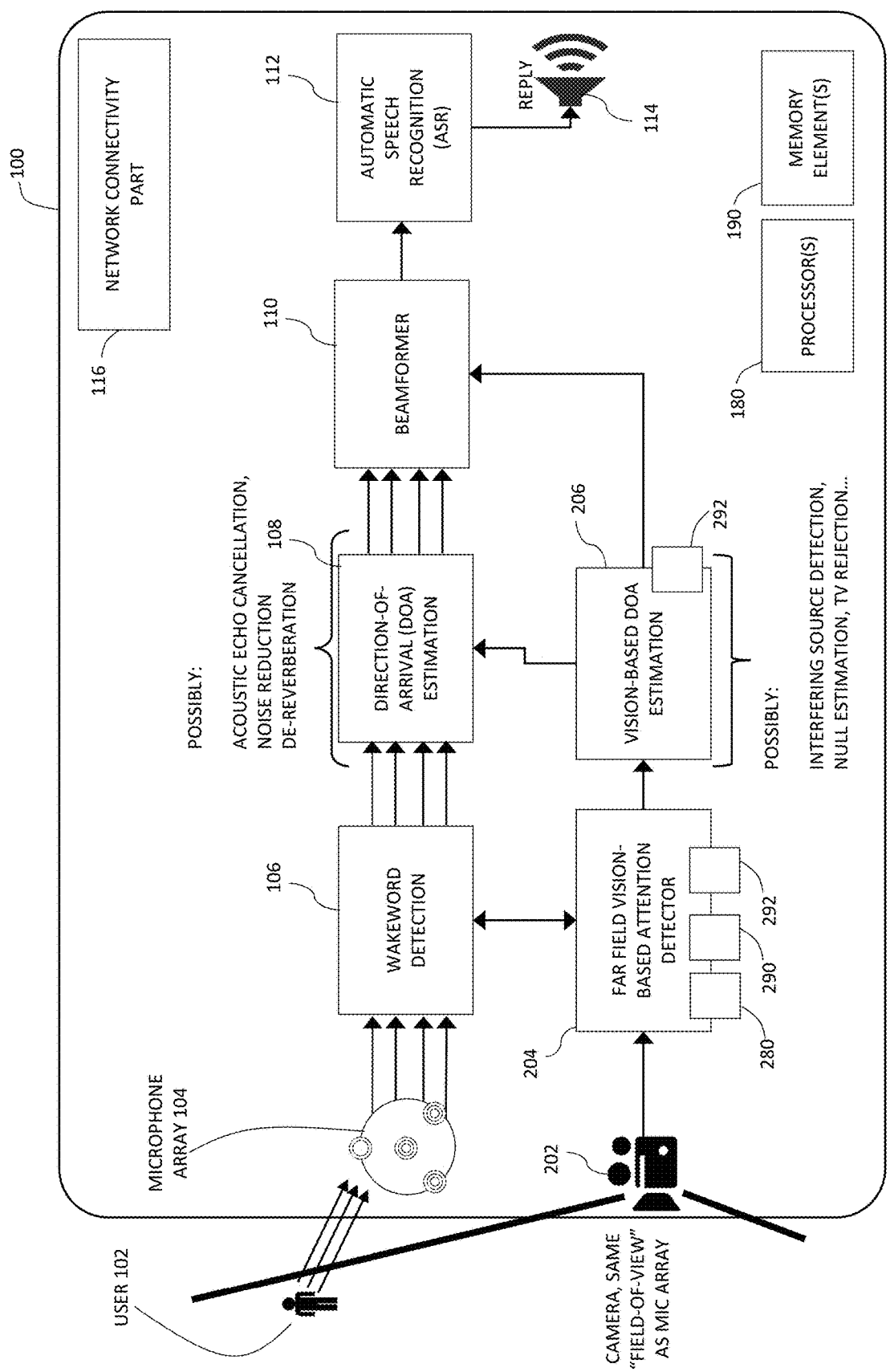
FIG. 2 illustrates how vision can be used to assist and/or replace the functions of voice-controlled far field device, according to some embodiments of the disclosure.

FIG. 2 illustrates how vision can be used to augment/replace the functions of voice-controlled far field device 100, according to some embodiments of the disclosure. One or more cameras 202 are added to the far field device 100, preferably in the same field-of-view" as the microphone array 104. Furthermore, a far field vision-based attention detector 204 is provided in the far field device 100 to augment and/or replace wakeword detection part 106.

Prior to vision-based processing, the vision-based pipeline may perform one or more pre-processing functions to prepare the video stream being captured by the one or more cameras 202. Examples of pre-processing functions can include: turning objects into grayscale, or other suitable color scheme, downsample the images for speed, upsample the images for performance reasons, undistortion/calibration steps to clean up the image, etc.

In some cases, the far field vision-based attention detector 204 can be extended to include classification/authentication of users (e.g., adult versus child), to further improve on the user experience. Classification may be useful for user interactions which may require age and/or user identification.

Vision-Based Attention Detector

As discussed previously, far field vision-based attention detector 204 detects far field attention. The mechanism for detecting far field attention is not trivial, because users can be at a range of distances from the far field device. Herein, a two-part detection technique is described. In the first part, the far field vision-based attention detector 204 detects or tests for frontal face(s) in the video stream. The first part is referred herein as the far field frontal face detection, which can be performed by a far field frontal face detector 280 in FIG. 2. Broadly speaking, the far field frontal face detector 280 in the first part is an example of a feature extraction component that can detect feature(s) that suggests a user is paying attention at a given moment in time or in a given video frame. In this specific example, the feature is the presence of a frontal face. In the second part, the far field vision-based attention detector 204 tracks the detected frontal face(s) and tracks how long the user(s) has been looking straight at the camera. The second part referred herein as attention tracking, which can be performed by an attention tracker 290 of FIG. 2. Broadly speaking, the attention tracker 290 in the second part is an example of a tracker that can track how long feature(s) suggesting attention has been detected. The attention tracker 290 can also be an example of a state machine that tracks a (consecutive) sequence of events, where the events correspond to detection of certain features. If a particular sequence of events is detected, the attention tracker 290 can output a positive result that can trigger other processes that can facilitate user interaction.

Testing for frontal faces can mean looking for faces in the video stream that are directly looking (straight) at or the far field device (i.e., the camera(s) of the device). An exemplary technique for detecting a frontal face is the Histogram of Oriented Gradients (HOG) based detector. However, applying this technique in the far field is not straight forward (and cannot be used out of the box) since an HOG-based detector requires objects of a certain size (e.g., 80×80 pixels, or some other size depending on the training dataset) to work well. When a user is in the far field, the size of the face can vary since the user can vary his/her distance with the camera easily in the environment of the far field device (a user can move around the environment easily). Generally, frontal face detection can be hard to tune for longer range (far field) applications. Furthermore, frontal face detection can be fooled by televisions, screens of mobile devices, where false detection can occur.

Figure 3:
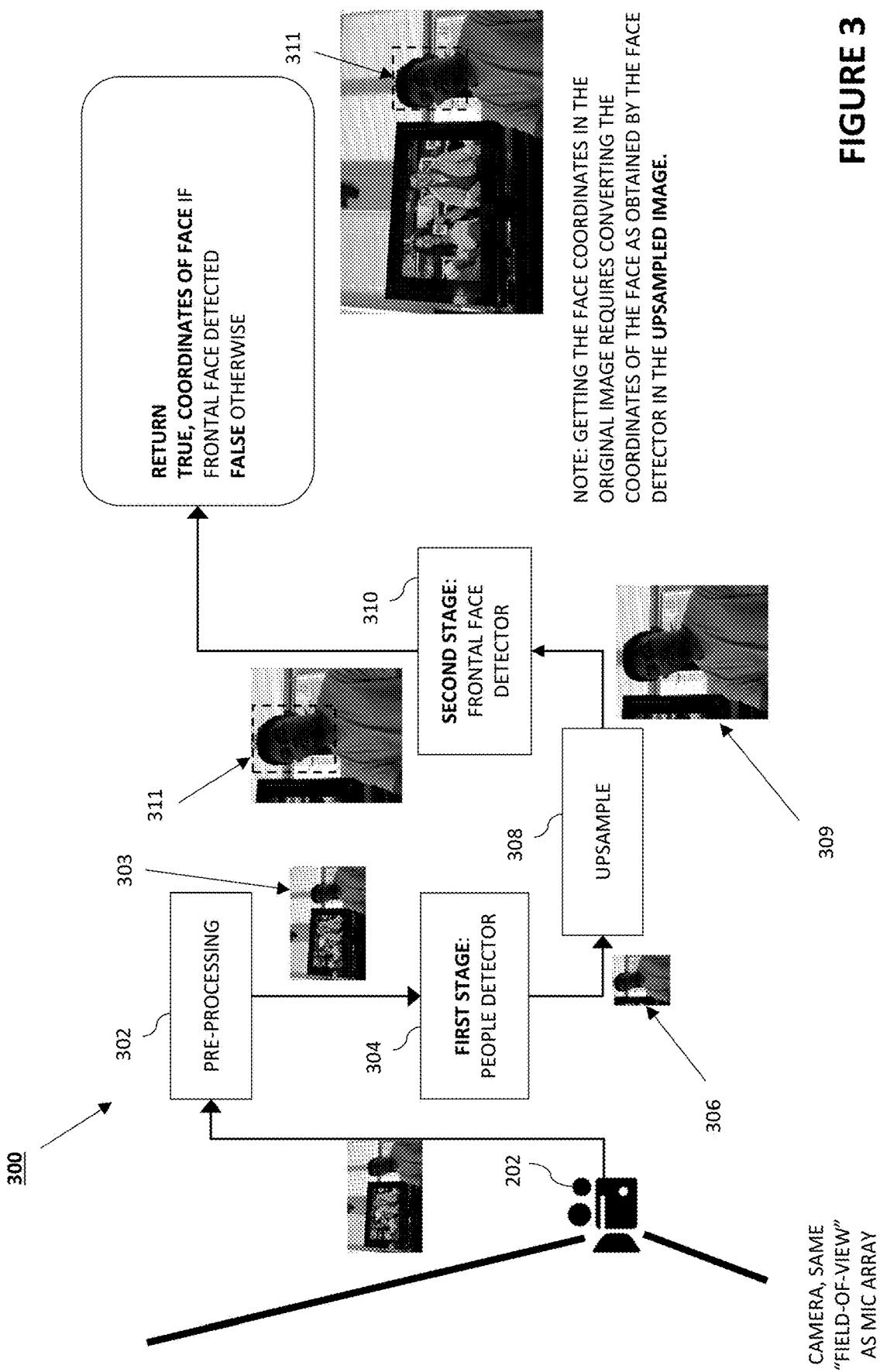
FIG. 3 illustrates an exemplary process 300 implemented by the far field frontal face detector 280, according to some embodiments of the disclosure.

To address these far field frontal face detection issues, the far field frontal face detector 280 described herein applies its own two-stage approach: (1) people detection and (2) frontal face detection. FIG. 3 illustrates an exemplary process 300 implemented by the far field frontal face detector 280, according to some embodiments of the disclosure. Prior to vision processing, a pre-processing part 302 can pre-process the video stream from camera 202, and generates video frames (e.g., video frame 303) for further processing. For illustration, the far field frontal face detector 280 is running the process 300 on a video frame of the video stream, but it is envisioned by the disclosure that the far field frontal face detector 208 is applied to numerous video frames of the video stream.

In the first stage 304, the far field frontal face detector 280 applies a "people detector" on a video frame 303 to detect one or more people in a video frame 303. The first stage 304 can determining one or more bounding boxes of the one or more detected people in the video frame 303. For simplicity, some examples discusses determining a bounding box in a video frame, but it is understood that one or more bounding boxes can be found in the video frame. A bounding box can be rectangular, and can be defined by pixel coordinates within the video frame, and in some cases, also by dimensions defining the size of the bounding box. A bounding box does not have to be rectangular, and can have a shape that matches the boundary of the detected person. A bounding box can bound an area of the video frame 303 where a person has been detected in the video frame by the people detector in the first stage 304. An exemplary bounding box for a detected person can include a person's head and torso.

Bounding box is an example of location information or area information within the visual field or video frame that can be used in the processes described herein. The location information or area information corresponds to an extracted feature that indicates attention. It is envisioned by the disclosure that other types of location/area information are equivalent and applicable to the processes described herein. For instance, a pixel location can be used. A group of pixel locations can be used. In another example, a pixel location with a defined radius can be used. In yet another example, a pixel location with a predefined surrounding area/shape around the pixel location can be used. In a further example, a pixel location with a predefined area function defining an area surrounding the pixel location can be used. In a further example, a pixel location with a predefined area function defining an area surrounding the pixel location and probability distribution defining weights corresponding to various points in the area can be used.

A people detector of the first stage 304 can implement a neural network (e.g., using Tensorflow's Object detection application programming interface (API)) to get a bounding box within the video frame 303 that encloses just the person. The training set for the first stage 304 can include images of people at various scales and where the people are indicated as bounding boxes in the image. Based on such training set, the neural network can detect people in a video frame at various sizes and generate a bounding box for each detected person.

The sub-image of the detected person (e.g., sub-image 306) is extracted or isolated based on a bounding box (e.g., using the coordinates of the bounding box) determined by the first stage 304. In other words, the sub-image 306 is an image within the bounding box.

An upsample part 308 can upsample the sub-image 306 of the detected person based on an upsampling factor. An upsampling factor can be applied to obtain an upsampled sub-image 309, such that the face in the upsampled sub-image 309 is of a fixed dimension, e.g., roughly p×p pixels big. p×p is thus a fixed dimension of the (preferred) face size. The upsample part 308 scales the sub-image such that a face in the upsampled sub-image 309 would have the fixed dimension of the preferred face size.

The upsampling factor is calculated using the following equations (e.g., where p=100):

$(w,h)$=dimensions of image of detected person $u_1=\text{ceil}(p/\min(w/3,h/8))$ $u_2=2^{\log 2(u_1)}$ w is the width of the sub-image 306 and h is the height of the sub-image 306. The geometric relationship relates a face and a whole body (a whole body or a partial body is typically found in the bounding box of a people detector, i.e., the sub-image), and the geometric relationship is encapsulated by the above equations. First, an intermediate upsampling factor $u_1$ is calculated in terms of width w and height h of the sub-image and based on the geometric relationship. The above equations, e.g., the geometric relationship, assumes that a face would roughly occupy a third of the width or an eighth of the height of a sub-image. Other suitable ratios for the geometric relationship can be used. The minimum of w/3 and h/8 helps to select the "safer" intermediate upsampling factor $u_1$ (accounting for the worst case, in case the bounding box only bounds the head and only partially the body).

Based on the intermediate upsampling factor $u_1$, the final upsampling factor $u_2$ can be calculated. After calculating the final upsampling factor $u_2$, the sub-image 306 (having width w and height h) is upsampled by $u_2$, and the resulting upsampled sub-image 309 can (approximately) make the face in the upsampled sub-image p×p pixels big. Note that, the upsample part 308 is scaling the sub-image based on a geometric relationship of a face versus a whole body to ensure that the upsampled sub-image 309 has a face that is p×p pixels big and to prepare the upsampled sub-image 309 for further processing.

Frontal face detection schemes can require the face to be at a specific size, and the schemes cannot readily use the sub-image 306 for frontal face detection (prior to upsampling), since the size of the face in the sub-image 306 can vary greatly from another sub-image. Selecting the upsampling factor to ensure that the face in the upsampled sub-image 309 is more or less p×p pixels big would make the upsampled sub-image 309 more suitable for a frontal face detector, i.e., the second stage 310.

The first stage 304 can advantageously detect people of different sizes (meaning the sub-image 306 can be of an arbitrary size) and make sure that people are detected even when they are at varying distances from the far field device. However, the sub-image 306 may not be suitable for a frontal face detector in the second stage 310, which can require input having faces of a fixed dimension. The upsample part 308 can effectively address this issue. By upsampling appropriately, the frontal face detector in the second stage 310 can reliably process the upsampled sub-image 309 once the sub-image 306 is upsampled by ensuring that any faces in the upsampled sub-image 309 is of the fixed dimension preferred by the frontal face detector of the second stage 310. The upsampling is not limited to upsampling only, but can also implement downsampling. Therefore, upsample part 308 can be more broadly seen as resampling or resizing. With the first stage 304 and the upsample part 308, the far field frontal face detector 280 can help make sure that the far field frontal face detector 280 overall can effectively and robustly detect frontal faces of users in a far field scenario, including when the users are far away (e.g., 10 feet away from the far field device) and when the users are closer to the far field device (e.g., 2 feet away from the far field device).

The upsampled sub-image 309 is then passed to the second stage 310, i.e., the frontal face detector, which can find frontal faces in the upsampled sub-image 309. The second stage 310 can be implemented using the HOG-based detector which is trained to detect frontal faces of a fixed dimension (e.g., p×p pixels big). The second stage 310 can be used to precisely/accurately detect whether a face is looking straight at the far field device (i.e., a positive frontal face) or looking off to the side (i.e., a negative frontal face). If a frontal face is detected by the second stage 310, the output can return true with the coordinates of the frontal face. If a frontal face is not detected by the second stage 310, then the output can return false. The coordinates 311 of the detected frontal face can be converted back into the coordinates of the original image using the upsampling factor $u_2$.

Figure 4:
FIG. 4 illustrates an example of results of the far field frontal face detector 280, according to some embodiments of the disclosure.

FIG. 4 illustrates an example of results of the far field frontal face detector 280. A sub-image bounded by bounding box 402 can be found by the first stage 304 (people detector) from the video frame 400. A face in the bounding box 404 can be detected in a sub-image bounded by bounding box 402 by the second stage 310 (frontal face detector). The sub-image bounded by bounding box 402 may be upsampled by an upsampling factor prior to processing by the second stage 310.

A variety of implementations are possible for accomplishing the same technical task of extracting/detecting feature(s) that suggests the user is paying attention to the far field device at a given moment in time or in a given video frame. As discussed previously, the far field frontal face detector 280 in the first part is an example of a feature extraction component that can detect feature(s) that suggests a user is paying attention at a given moment in time or in a given video frame. Other implementations are possible to achieve this technical task, where the far field frontal face detector 280 is implemented to extract/detect other kinds of features that suggests the user is paying attention to the far field device at a given moment in time or in a given video frame.

Exemplary features extractable from a video frame can include: frontal faces, side faces, eyes' gaze direction, color information, histograms of colors or pixel values in the video frame or a bounding box, edges information, corners information, blobs information, shapes information, contrast information, intensity information, noise information, templates information, energy information, frequency domain information, scale-invariant features, movement/motion information, etc.

Note that the second stage 310 (frontal face detector) detects a frontal face and uses a frontal face as an indicator or feature that suggests the user is paying attention to the far field device at a given moment in time or in a given video frame. It is envisioned by the disclosure that the second stage 310 can detect other feature(s) besides frontal faces in the bounding box in order to determine attention. To detect other features, other types of vision-based processing can be performed in the second stage 310 to detect other feature(s). In one example, rather than detecting frontal faces, the second stage 310 can include a detector that can detect side face and eyes' gaze towards the far field device, and use the side face and eyes' gaze towards the far field device as a feature that suggests the user is paying attention to the far field device. In the far field, a user may not necessarily be staring straight at the far field device when the user is paying attention to the far field device, but the user may have their head turned slightly away from the far field device but the eyes are gazing directly at the far field device. Accordingly, detecting a side face and eyes' gaze towards the far field device can be particularly beneficial for detecting attention in far field contexts. In another example, the second stage 310 can include a detector that detects certain facial expression(s), and use certain facial expression(s) as a feature that indicate attention. A user may have a particular facial expression when the user is paying attention to the far field device. Facial expressions may include enlarged eyes, oblique eyebrows, etc.

The far field frontal face detector 280 can be configured to extract/detect one or more features (one particular feature, or a combination of features) suitable for the application to detect attention to the far field device at a given moment in time or in a given video frame. In some cases, the far field frontal face detector 280 can include a classifier that can output an attention event in the far field context based on one or more features extractable from the video frame. If the one or more features extractable from the video frame meets one or more specific criteria, the classifier can output an attention event. The classifier can include a neural network classifier. The classifier can include a weighted combination of features extractable from the video frame. The classifier can include a combination of logical operations (e.g., decision tree). The classifier can include Bayesian inference. The classifier can include support vector machines. Other classifiers are envisioned by the disclosure.

As discussed in relation to FIGS. 3 and 4, a first stage 304, an upsample part 308, and a second stage 310 are preferably included in the far field frontal face detector 280 to detect frontal faces in far field contexts, and specifically, the example uses frontal faces as a feature that suggest attention for a given video frame or moment in time. The first stage 304 and upsample part 308 were implemented because frontal face detection (e.g., an HOG-based detector) in the second stage 310 prefers input images depicting a frontal face having a certain size. Depending on the implementation of the second stage 310, some implementations may skip the first stage 304 and upsample part 308, especially if the second stage 310 is detecting other feature(s) besides frontal faces. Accordingly, depending on the feature(s) to be extracted, the far field frontal face detector 280 may not require the first stage 304 and upsample part 308.

Once a frontal face or attention is detected by the far field frontal face detector 280, an attention tracker 290 of FIG. 2 can track how long the user has been looking straight at the camera(s), or how long certain feature(s) that indicates attention have been detected. Tracking how long a feature has been detected is an indicator that the user intends to interact with the far field device. In other words, by tracking how long the feature has been detected and comparing it against a threshold allows the far field vision-based attention detector 204 to infer that the user intends to interact or continue to interact with the far field device. If the feature has been detected for a sufficient period of time, the far field device can trigger another process to be executed in the far field device that facilitates the user interaction. Video frames can be processed using the far field frontal face detector 280, and the detected frontal face(s) or other extracted features resulting from processing the video frames through the far field frontal face detector 280, (e.g., coordinates of the frontal face(s) within the video frames) can be used to build state information across the video frames for one or more previously-detected people. The state information can be updated frame by frame based on any detected frontal face(s) in a given frame. The state information for a given previously-detected person can be updated frame by frame to track a period of time (time-period) that a frontal face or other suitable feature(s) indicating attention has been detected for the given detected person, e.g., in bounding boxes (found across frames) associated with the given previously-detected person.

If the time-period exceeds a threshold, an attention event is detected and can be used to wake up the far field device to start listening or initiate further audio processing (in a similar fashion as detecting a wakeword event). The time-period can be defined in units of time (e.g., seconds), number of frames of the video stream, and any other suitable metric that indicates duration. Looking at the device for a time-period exceeding a threshold can be considered as a "deliberate look", "intention to interact with the far field device", or "attention event". The attention tracker 290 can thus compare the period of time for the given detected person against the threshold, and output an attention event in response to determining that the period of time exceeds the threshold.

The attention tracker 290 can be viewed as a state machine which can maintain states of objects/previously-detected people across frames. The attention tracker 290 can implement a scheme to keep track of detected frontal faces (belonging to the same person or associated with the given detected person) across frames. When attention has a notion of time, state is maintained across frames to assess whether a same frontal face has been detected for a period of time to trigger the detection of an attention event. When there are multiple people in the frames, the attention tracker 290 may implement a scheme to maintain state information for multiple previously-detected people, and keep track of which one of the people is looking straight at the far field device.

Figure 5A:
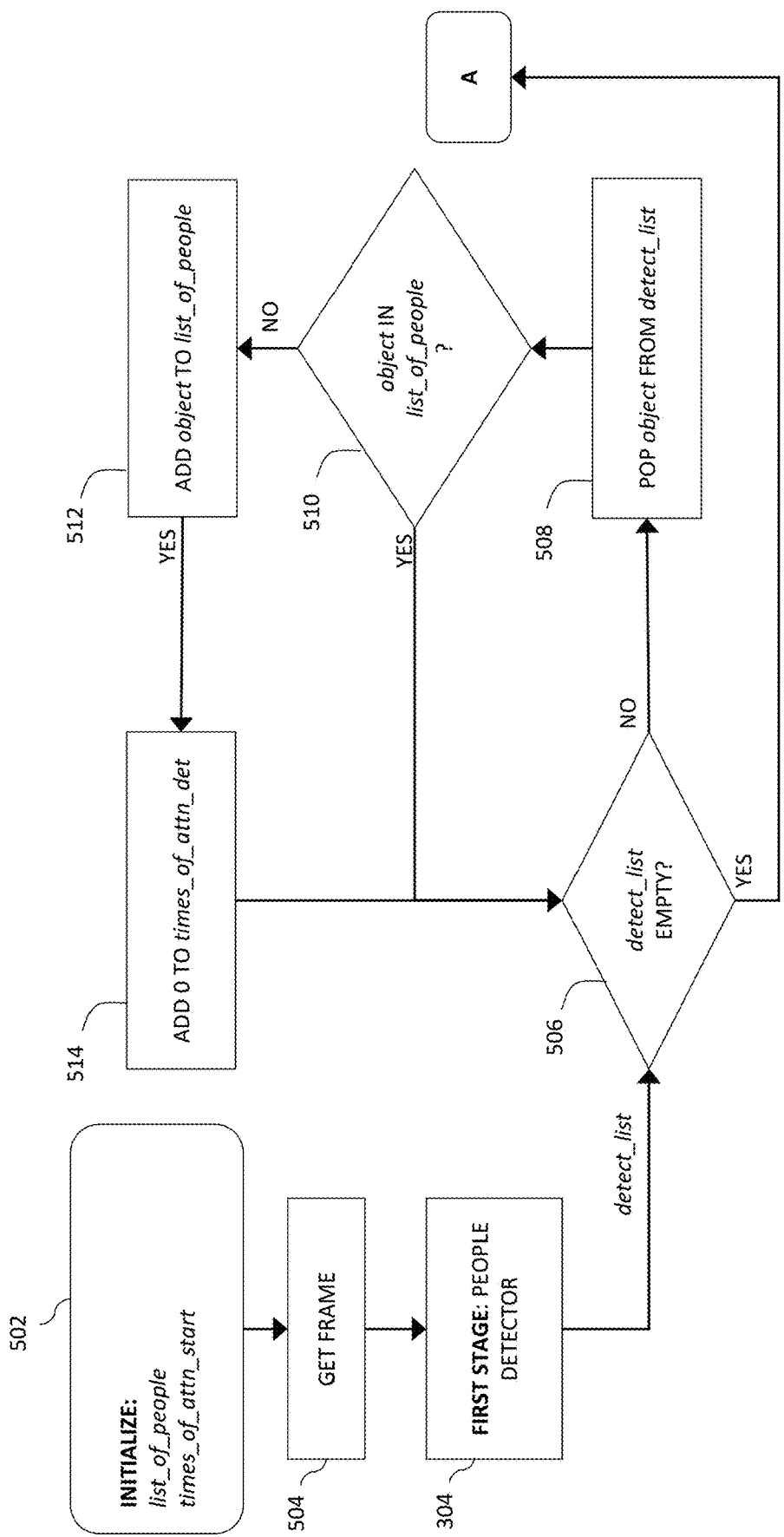
FIGS. 5A-5B illustrates how the far field vision-based attention detector 204 can maintain state across frames, according to some embodiments of the disclosure.
Figure 5B:
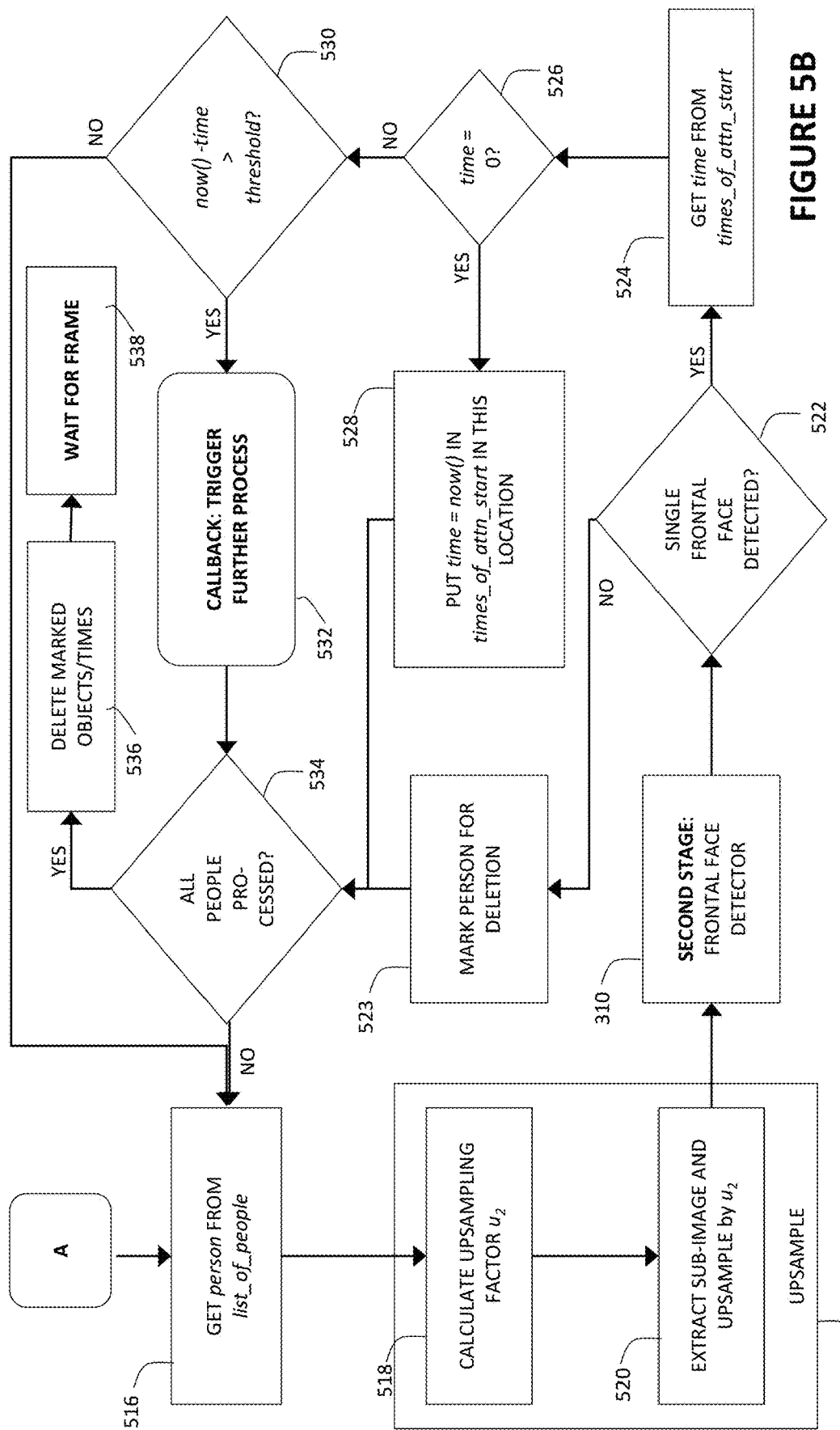

FIGS. 5A-5B illustrates how the far field vision-based attention detector 204 can maintain state across frames, according to some embodiments of the disclosure. The process illustrated in FIGS. 5A-5B includes the process seen in FIG. 3, and functions performed by attention tracker 290 of FIG. 2. It is envisioned that other schemes can be used for carrying out similar goals. The far field vision-based attention detector 204 can answer questions such as, "how do you know which person is paying attention?" and "how do you know how long a particular person has been paying attention?"

In 502, the far field vision-based attention detector 204 initializes a list of people "list_of_people" and a list of attention event start times (e.g., times when the people started paying attention) "times_of_attn_start". The lists are empty when they are first initialized. The two lists are coupled/linked together, and can be maintained as a coupled list. Each entry in "list_of_people" has a corresponding entry in "times_of_attn_start". "list_of_people" maintains a list of bounding boxes of previously-detected people or previously-detected bounding boxes. "times_of_attn_start" maintains a list of times or time indicators (e.g., frame number) of when a given person (i.e., a bounding box) started paying attention (e.g., has a frontal face detected).

In 504, a video frame is retrieved from the video stream. The first stage 304 (people detector) is applied to the video frame. The output of the first stage 304 is a list of detected people in the frame "detect_list". Specifically, the "detect_list" has a list of one or more bounding boxes of people detected in the video frame (e.g., coordinates and/or dimensions of the bounding boxes). The subsequent part in FIG. 5A helps to keep track of people across frames. In 506, a check is performed to see if the "detect_list" is empty. As long as the "detect_list" is not empty, a process is performed to update the "list_of_people". In 508, an object is popped from the "detect_list".

In box 510, a check is performed to see if the popped object is already in the current "list_of_people". The technical task of the check is to determine if two objects (i.e., two bounding boxes) are the same. There can be noise in both bounding boxes. To properly maintain state across frames, the check can test if a particular person is being tracked already or not. The list_of_people" can maintain previously-detected bounding boxes. To perform the check, the popped object can be compared with the previously-detected bounding boxes by determining whether the center of the bounding box of the popped object is contained in a given previously-detected bounding box and whether the center of the given previously-detected bounding box is contained in the bounding box of the popped object. Both conditions are expected to be true if the two bounding boxes are of the same person. Such a check can be efficient and effective. The scheme can also be robust in scenarios where the person moves from frame to frame. In some cases, the check assesses if the bounding box of the popped object sufficiently overlaps with a bounding box in the current "list_of_people". In some cases, the check determines if the bounding boxes are sufficiently similar (e.g., by coordinating pixels between two bounding boxes), or if the bounding boxes have sufficient match with each other to assume that the two bounding boxes are of the same previously-detected person.

If the popped object is already in the current "list_of_people", do nothing, and return to 506. If the popped object is not already in the current "list_of_people", in 512, the popped object is added to the "list_of_people" (current list of people that the far field vision-based attention detector 204 is currently tracking). Furthermore, in 514, an entry is added to "times_of_attn_det" list (at a location corresponding to the popped object's location in the "list_of_people") to initialize a value that the popped object is being tracked. The value can be "0", or some suitable value that indicates the popped object is now being tracked. At this point, it has not been determined whether the popped object is actually paying attention (i.e., whether a frontal face has been detected in the bounding box of the popped object), but the popped object is now being tracked.

The far field vision-based attention detector 204 performs this process until the "detect_list" is empty, and proceeds to the next part (indicated by box "A"). In this next part, for each object (referred herein as person or previously-detected person) in the "list_of_people" a process is performed to determine how long a person has been paying attention continuously. In 516, a person (e.g., bounding box bounding a sub-image) is selected from "list_of_people" for processing. In upsample part 308, an upsampling factor $u_2$ is calculated (518) and the sub-image is extracted based on the bounding box is upsampled by $u_2$ (520). The second stage 310 (frontal face detector) is applied to the upsampled sub-image. In 522, the far field vision-based attention detector 204 checks to see if a (single) frontal face is detected in the upsampled sub-image. For a given person in the "list_of_people", if a (single) frontal face is detected, there is a good chance that the given person is paying attention to the far field device. If not, the person can be marked for deletion from the "list_of_people". If yes, the far field vision-based attention detector 204 fetches the corresponding value in the "times_of_attn_start" list for the person (524). If the corresponding value in the "times_of_attn_start" list for the person is 0 or has a value which indicates that the person has just started being tracked (check performed in 526), then this is the first time the person is being tracked. The far field vision-based attention detector 204, in this case, can put a time indicator (e.g., now( )) which indicates the current time (or current frame) in "times_of_attn_start" for the person. This current time or current frame marks the beginning of when the person began paying attention. If the corresponding value in the "times_of_attn_start" list for the person is not zero, then a previous iteration of the loop has already put in a time indicator (e.g., now( )) for this person.

In 530, a check is performed to determine whether the current time (e.g., now( )) minus the corresponding value exceeds a threshold. If yes, the far field vision-based attention detector 204 has detected an attention event. An attention event can indicate that the person has been paying attention to the far field device for over a predetermined amount of time (e.g., one second, two seconds, etc.). In 532, one or more further processes are triggered in response to detecting an attention event. In some cases, the beamformer can be triggered. Other action(s) can also be triggered in response to the detection of the attention event. For instance, vision-based DOA estimation can be triggered. If not, the process returns to 516.

The further process can be running in parallel with the far field vision-based attention detector 204, where parameters of said further process can be updated based on the results of the far field vision-based attention detector 204. In some cases, a check can be performed to see if the further process has already been triggered so that the further process is only triggered once or so that the further process is not triggered again inappropriately. The callback functionality in 532 can depend on the further process being triggered.

In 534, the far field vision-based attention detector 204 checks to see if all people/objects in "list_of_people" has been processed by the loop. If not, the attention tracker proceeds to check the next person/object in the "list_of_people". If yes, the far field vision-based attention detector 204 proceeds to delete object(s) and time(s) for objects marked for deletion (536). The far field vision-based attention detector 204 proceeds to process the next frame (538).

Besides what is shown in FIGS. 5A-5B, the far field vision-based attention detector 204 can also include one or more of the following: one or more resets (e.g., every so often, clear all lists, reset all states, etc.), one or more timeouts (especially relevant when augmenting audio rather than replacing it), and one or more triggers (especially relevant when augmenting audio rather than replacing it).

As discussed in detail in relation to FIGS. 5A-5B, the far field vision-based attention detector 204 has an attention tracker 290 that can track how long certain feature(s) that indicates attention, such as frontal faces, have been detected by building state information across video frames. When the duration exceeds a threshold, an attention event is detected. This attention event can be seen as an example of a positive detection result being generated by the far field vision-based attention detector 204. Broadly speaking, this positive detection result can be an indicator that the user intends to interact with the far field device, and the far field device triggers a subsequent process to be executed to facilitate the user interaction. Accordingly, duration that the feature(s) have been detected triggers a positive detection result to be generated by the vision-based attention detector 204.

Broadly speaking, state information being built across video frames can be information that can track a sequence of events (i.e., feature detection events) and optionally the durations of the events occurring in a specific order. Accordingly, a particular valid sequence of features being detected across video frames can trigger a positive detection result for the vision-based attention detector 204. The scheme illustrated in FIGS. 5A-5B can be extended or modified to track occurrence of events and output a positive detection result if a particular sequence of events has been detected. For instance, the far field vision-based attention detector 204 can include two feature extractors: far field frontal face detector 280 and a mouth movement detector. The attention tracker 290 can track whether a frontal face has been detected for a particular detected person, and also track whether mouth movement has been detected for this particular detected person. When the attention tracker 290 detects a frontal face followed by mouth movement, the far field vision-based attention detector 204 can output a positive detection result. Accordingly, a valid sequence of events can trigger a positive detection result by the far field vision-based attention detector 204.

In some embodiments, variations can be done to the scheme illustrated in FIGS. 5A-5B to reduce compute burden. For instance, in some cases, rather than running the first stage 304 (people detector) on each frame, the first stage 304 can be run every, e.g., 50 frames. The first stage 304 can detect all people and add them to the "list_of_people". A tracker (e.g., a correlation tracker on the pixels of a given bounding box) can be initialized for each one of previously-detected people. The far field vision-based attention detector 204 can determine where the bounding box has moved to from frame to frame and update the "list_of_people" accordingly. For each of the bounding box, a second stage 310 (frontal face detector) is run on each frame. However, the previously-detected people are not removed from the "list_of_people" in the second stage 310 (frontal face detector) when attention is not detected. Rather, frontal faces can be detected in the second stage 310 and the tracker and other state information can be updated at each frame (which is computationally relatively easy). The "list_of_people" can be pruned if the tracking quality dips below a threshold instead (so the far field vision-based attention detector 204 is not tracking people that is not doing anything, or not moving at all for an extended period of time). The far field vision-based attention detector 204 is likely running on an embedded platform with limited compute power. The first stage 304 (people detector) can be computationally intensive, and these variations can reduce the number of times the first stage 304 has to be run.

Note that far field vision-based attention detector 204 can be used in other contexts besides far field user interfaces. For self-driving or computer-assisted driving scenarios, it can be beneficial for cameras mounted on a car to know if a pedestrian, a biker, another driver, or other people or animals sharing the environment, is paying attention to the car. In some cases, if a pedestrian is paying attention to the car, the car can interpret that the car can proceed through an intersection assuming the pedestrian would not jump right in front of the car. But if the pedestrian is on a cell phone and not paying attention, it is possible that the car may take precautions or stop to wait for the pedestrian, assuming the pedestrian might walk straight into the path of the car. The mechanisms described herein for far field vision-based attention detector 204 can also be used to detect attention in these kinds of contexts.

Vision-Based Interferer Rejection

Audio-based user interfaces not only hear from actual users, but also other unwanted sources ("interferers") such as televisions. Audio coming from a television can accidentally interact with the far field device and cause unintended results. Vision-based schemes can be used to provide a rejector, such as a television rejector into the vision-based far field user interface, such that the user interface can recognize when a person is from a television and that audio from the television cannot wake up the far field device or trigger unintended results on far field device.

The solution to this issue is to provide a vision-based interferer rejector for detecting the unwanted sources, and integrating the vision-based interferer rejector into the far field vision-based attention detector 204 (e.g., illustrated by FIGS. 5A-5B). Referring back to FIG. 2, the vision-based interferer rejector 292 can be included in far field vision-based attention detector 204. The vision-based interferer rejector 292 can run periodically or at predetermined instants (e.g., every minute, every 10 minutes) to detect the presence of interferers such as televisions. For instance, a classifier comprising one or more neural networks can be trained to look for classes of interferers: televisions, screens, laptops, mobile devices, mirrors, windows, picture frames, etc. A list of detected interferers, i.e., bounding boxes of the interferers (e.g., representing location and dimension of televisions or more generally rectangular objects) can be maintained. When the first stage 304 (people detector) is run, it is possible to also check whether the detected people from the first stage 304 are within any one of the bounding boxes of detected interferers. If the detected person is contained within a bounding box of detected interferer, the detected person can be marked as an interferer, and/or ignored for other processing.

Figure 6:
FIG. 6 shows an example where people in a television is detected by the vision-based interferer rejector and subsequently ignored for further processing, according to some embodiments of the disclosure.

FIG. 6 shows an example where people in a television is detected by the vision-based interferer rejector 292 and subsequently ignored for further processing. A frame 600 is processed by the first stage 304 (people detector), and the first stage 304 can detect three people: one person standing in front of the television, and two people inside the television. A vision-based interferer rejector 292 can detect a television, as seen by bounding box 602. Because the two people inside the television is within the bounding box 602, the two people inside the television would be considered as interferers and would be subsequently rejected for further processing. The detected person of bounding box 604 is not contained within the bounding box 602 and therefore is processed in the second stage 310 (frontal face detector), which can find the frontal face in box 606.

In some embodiments, detected people from the first stage 304, who do not have a frontal face or other suitable feature indicating attention, can be considered a person who is not paying attention, and can be tagged as an interferer. In other words, the lack of features suggesting attention can mean that the person is not paying attention and is to be tagged as an interferer. Unless the detected person start to have a feature that indicates attention, the detected person can be considered as an unwanted source, and be labeled as an interferer (and ignored) for certain kinds of processing.

Vision-Assisted Audio Processing

Audio-based DOA estimation and noise cancellation can be challenging. In some cases, the audio-based DOA estimation part has to recognize speech signatures and determine who is talking (which one is the targeted user or not the targeted user). Audio-based DOA estimation part needs to reject noise sources (e.g., television or radio), which can be difficult to do. Furthermore, Audio-based DOA estimation has to accurately determine the direction of the audio source. If two people are in the room, it can be difficult to distinguish or separate two voices and accurately determine the direction of the two people. Augmenting the voice (or audio) modality with vision can improve some of these audio processing mechanisms.

To implement vision-assisted audio processing, one or more cameras (e.g., camera 202 of FIG. 2) can be provided to the far field device, e.g., in the same "field-of-view" as microphone array (e.g., microphone array 104 of FIG. 2). The field-of-view of the microphone array can be a hemisphere (upper hemisphere or hemisphere in front of the device). The one or more cameras can be a wide angle view camera with sufficient resolution. The one or more cameras can include one or more of the following: a 2D color or black and white (B/W) camera (e.g., with a wide angle lens), a depth camera (providing 3D and/or depth information), a time-of-flight camera, an infrared camera (for operating in low light conditions), etc.

Referring back to FIG. 2, the far field device 100 illustrates how vision can be used to assist and/or replace the functions of voice-controlled far field device, according to some embodiments of the disclosure. Specifically, a vision-based DOA estimation part 206 is provided to assist functions being carried out in, e.g., DOA estimation part 108, beamformer 110, or other audio processing functions. Vision-based DOA estimation part 206 receives one or more detected people, and/or one or more attentive people, such as detected frontal faces (i.e., bounding boxes thereof), from a suitable vision-based far field attention detector (e.g., embodiments of the far field vision-based attention detector 204 illustrated herein). Based on a detected person and/or an attentive person, DOA(s) can be estimated and used for assisting audio processing functions such as the beamformer 110.

Prior to vision-based processing, the vision-based pipeline may perform one or more pre-processing functions to prepare the video stream being captured by the one or more cameras 202. Examples of pre-processing functions can include: turning objects into grayscale, or other suitable color scheme, downsample the images for speed, upsample the images for performance reasons, undistortion/calibration steps to clean up the image, etc.

It can be particularly beneficial for the vision-based DOA estimation part 206 to integrate/implement vision-based interferer rejection (e.g., incorporate a vision-based interferer rejector 292 in vision-based DOA estimation part 206), because audio-based DOA estimation techniques have a harder time determining interference sources. In some cases vision-based DOA estimation part 206 can replace audio-based DOA estimation part 108 if the audio-based DOA estimation is insufficient, incorrect, or unsuccessful.

In one example, vision-based DOA estimation part 206 can include vision-based interferer rejection (e.g., vision-based interferer rejector 292) to determine whether an audio source originated from a television or a mirror. Specifically, vision-based DOA estimation part 206 can recognize a television or other possible objects (undesired or unintended audio sources), and reject audio coming from the direction of the recognized television/object.

In another example, vision-based DOA estimation part 206 has information associated with a plurality of users' faces and determine relative locations of the users to better assist audio-based DOA estimation and/or beamformer to better distinguish/separate the users. Vision-based DOA estimation part 206 can also assist the beamformer 110 in amplifying one recognized user while nulling out another user.

Figure 7:
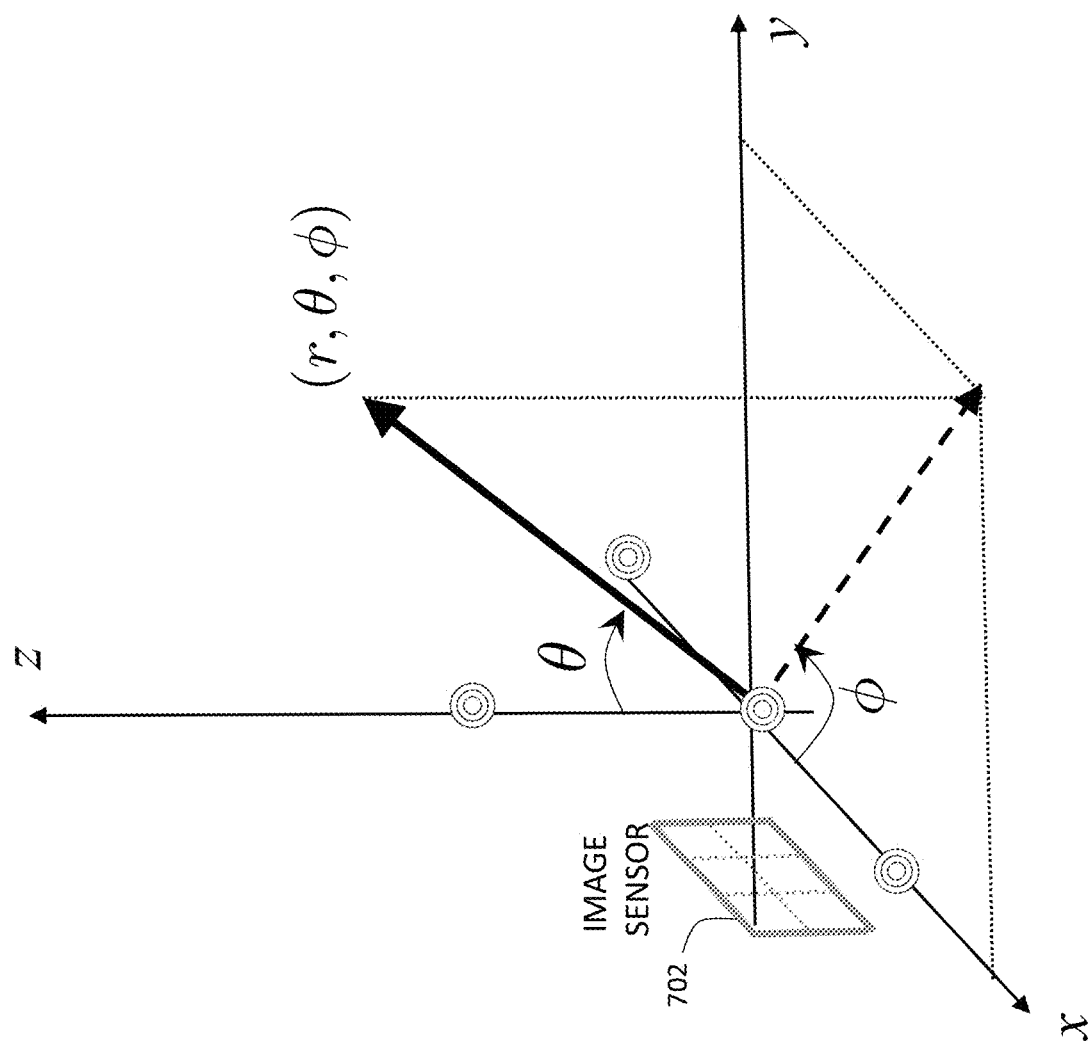
FIG. 7 shows how to determine direction of arrival (DOA) information from the output or results of the vision-based far field attention detector, according to some embodiments of the disclosure.

FIG. 7 shows how to determine DOA information from the output or results of the vision-based far field attention detector 204, according to some embodiments of the disclosure. To get a DOA for the beamformer 110, the knowledge of the image sensor 702 (e.g., one or more cameras 202) and microphone array (e.g., microphone array 104) are oriented with respect to each other. In the example shown, the microphones of the microphone array sits on the x-z plane, and the image sensor 702 is parallel to the x-z plane. The angles $\theta$ and $\phi$ are defined with respect to the plane of the beamformer 110, typically as shown (although any reasonable coordinate system may be chosen instead). The image sensor 702 and beamformer 110 may have different relative orientations: as long as the orientation relationship is known, the coordinate systems can be determined. The technical task for the vision-based DOA estimation part 206 is to determine how a detected person and/or a frontal face centered at $p_x$, $p_z$ can be translated to a suitable direction (e.g., unit vector) for the beamformer 110.

(X, Z) as the image coordinates system. The location ($\overline{X}$, $\overline{Z}$) is where the image sensor 702 intersects the y-axis of the beamformer coordinate system (see FIG. 7, which shows the image sensor 702 is parallel to the x-z plane). Note that ($\overline{X}$, $\overline{Z}$) need not actually exist on the image sensor 702. The pinhole camera model says (where $f_x$, $f_z$ are the focal lengths of the camera in the x, z directions, respectively):

$$\alpha_x = \frac{X - \overline{X}}{f_x} = \frac{x}{y} = \frac{\cos\phi}{\sin\phi}$$

$$\alpha_z = \frac{Z - \overline{Z}}{f_z} = \frac{z}{y} = \frac{\cos\theta}{\sin\theta \sin\phi}$$

To compute the above, X is set to equal to $p_x$, and Z is set to equal to $p_z$. Unit vector in the direction ($\theta$, $\phi$) is then given by:

$$\vec{u} = \begin{bmatrix} \sin\theta \cos\phi \\ \sin\theta \sin\phi \\ \cos\theta \end{bmatrix} = \frac{1}{\sqrt{1 + \alpha_x^2 + \alpha_z^2}} \begin{bmatrix} -\alpha_x \\ 1 \\ -\alpha_z \end{bmatrix}$$

The unit vector determined based on $p_x$, $p_z$ can be provided to the beamformer 110, which can then direct a beam in the direction of that unit vector. The unit vector can be translated by the beamformer 110 to audio processing parameters, e.g., suitably delay and weight parameters for the signals coming from different directions and frequencies.

Figure 8:
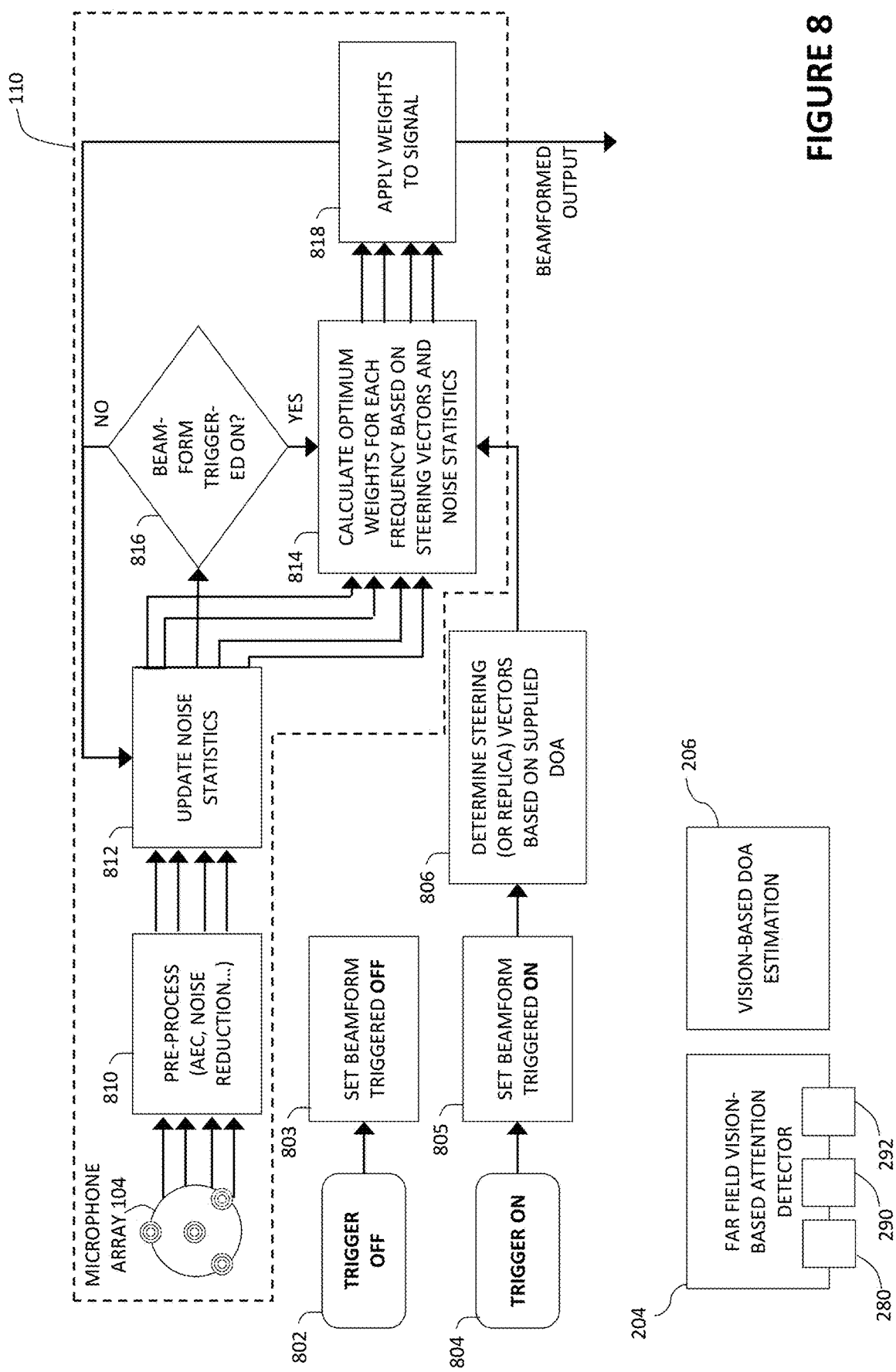
FIG. 8 illustrates an Minimum Variance Distortionless Reconstruction (MVDR) beamformer, according to some embodiments of the disclosure.

In general, the beamformer 110 can be a suitable adaptive beamformer, such as an adaptive Minimum Variance Distortionless Reconstruction (MVDR) beamformer. FIG. 8 illustrates an MVDR beamformer 110 that is augmented by vision-based processing, according to some embodiments of the disclosure. The beamformer 110 can include a microphone array 104. One or more audio signals can be pre-processed (810) to make the audio signals more suitable for further processing. Pre-processing 810 can include one or more of the following: acoustic echo cancellation (AEC), noise reduction, etc. The pre-processed audio signals can be used to update noise statistics (812).

The "trigger on" signal 804 for the beamformer 110 can be issued by another part of the far field device 100 (e.g., far field vision-based attention detector 204 or vision-based DOA estimation part 206). The beamformer 110 can be triggered on (805). For instance, the far field vision-based attention detector 204 can trigger the beamformer 110 when far field vision-based attention detector 204 has detected an attention event. Vision-based DOA estimator part 206 can supply a direction of arrival. In 806, an appropriate steering vector can be determined based on the direction of arrival. For instance, the vision-based DOA estimator part 206 can determine a unit vector based on the direction of arrival (using the scheme illustrated in FIG. 7), which can be used to derive a steering vector usable by the beamformer 110.

The "trigger off" signal 802 for the beamformer 110 that resets the beamformer 110 can be issued by the ASR system of the far field device 100 upon completion of a request. The beamformer can be triggered off or turned off (803).

The beamformer 110 can run in parallel with the vision-based schemes described herein. Beamformer 110 can maintain parameters for one or more beams and noise characteristics (associated with an acoustic beam or background noise). The beamformer 110 can update noise statistics (in the background), in 812. If the beamformer 110 is triggered on, the beamformer 110 can update optimum weights for each frequency based on steering vectors in 814 (e.g., based on the unit vectors described above) and noise statistics in 812. If the beamformer 110 is not triggered on, the beamformer 110 does not recalculate optimum weights, but does update noise statistics based on the audio signals coming from the microphone array 104 in 812. Finally, the beamformer 110 applies the weights to the audio signals to perform beamforming (i.e., beamformed output) in 818.

The beamformer 110 above can be modified so that it accepts multiple DOAs (from the vision-based DOA estimator part 206). For instance, the DOAs can include one or more DOAs for target(s) (e.g., a user) and one or more DOAs for interferer(s). In 806, appropriate steering vectors can be calculated based on the various DOAs. For instance, the vision-based DOA estimator part 206 can determine unit vectors which can be used as the steering vectors. The beamformer 110 can then compute weights so that the signal from the target DOA is amplified (positive weight), and, simultaneously, the signals from the interferer DOA(s) are nullified (negative weight). For instance, a second person in the room talking can be nullified while focusing on one speaker. Determining the locations of the disparate target and interfering sources from just audio can be very challenging. However, one can easily determine such information for the beamformer 110 using the far field vision-based attention detector 204 and/or vision-based DOA estimator part 206. All the detected people (or some suitable pixel chosen from within the bounding box of each detected person) can be treated as potential interferers.

Once a specific person causes attention to be detected, then (as described) the direction of center pixel of the face of that person is the target DOA. The directions of the previously chosen pixels for all the other people in the frame become interferer DOAs (these can be calculated using the same unit vector math described herein as illustrated by FIG. 7 with the pixel locations being the interferer pixel locations).

Exemplary Usage Scenarios and Variations

Herein, a far field user interface has been described where a user can wake up the device by looking at it. In such an operation mode, the far field vision-based attention detector 204 can replace voice activation (e.g., wakeword detection part 106). In some modes, a user can wake up the device with voice activation or by looking at it. In this case, each of the audio-based wakeword detection part 106 and the far field vision-based attention detector 204 could operate independently. Whenever one detects attention event, it can call/trigger the beamformer 110. One can also block the other until the beamformer 110 is complete. The vision-based DOA estimation part 206 can be used to assist the beamformer 110 no matter which mode the attention is detected (as it may be more accurate than the acoustic/audio-based DOA estimation part 108).

In some modes, a user must deliberately wake the system up with a wakeword. The person who woke the device up can be tracked for some fixed amount of time, and subsequent attention events can be detected using the far field vision-based attention detector 204. The acoustic DOA estimation part 108 can specify in which direction the wakeword came from. The far field vision-based attention detector 204 can then look in that area for a likely target (here, only the first stage 304 (people detector) may be needed). Once a target is found, it is tracked (either using a correlation tracker or by applying the people detector in the first stage 304 and/or frontal face detector in the second stage 310 in the appropriate part of the image, for instance). Attention detection is applied only to the tracked target (i.e., the list_of_people is no longer necessary).

Exemplary Methods

Figure 9:
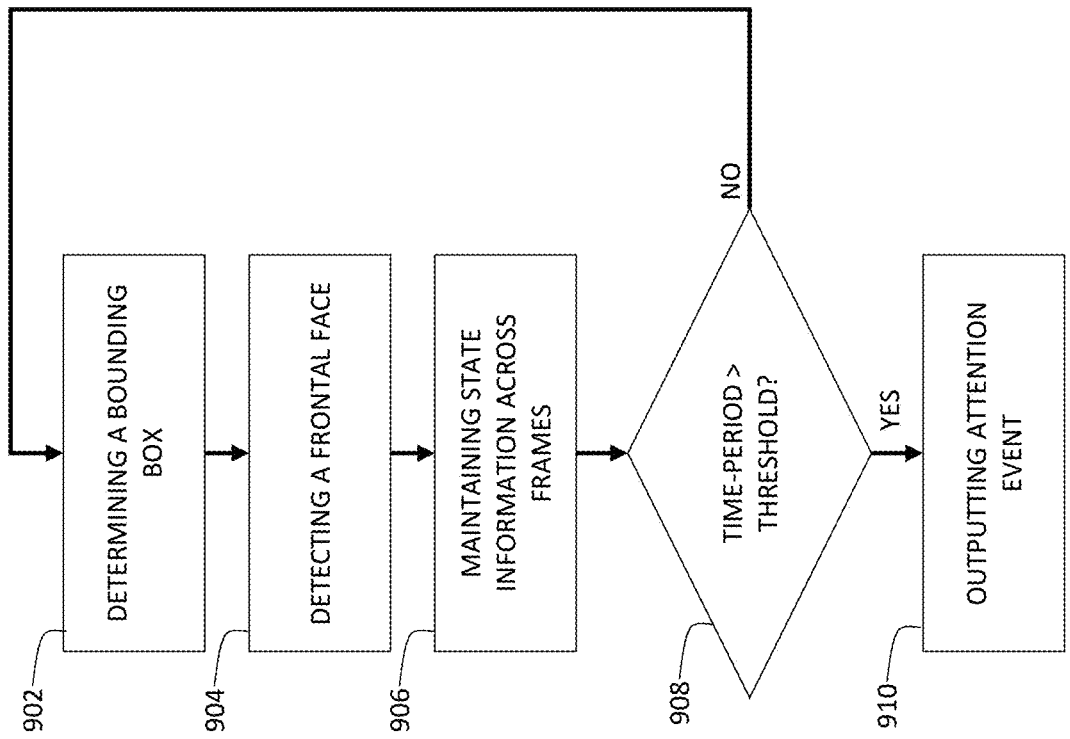
FIG. 9 is a flow diagram illustrating a method for vision-based far field attention detection, according to some embodiments of the disclosure.

FIG. 9 is a flow diagram illustrating a method for vision-based far field attention detection, according to some embodiments of the disclosure. In 902, a people detector can determine a bounding box of a detected person in a video frame. In 904, a frontal face detector can detect a frontal face in the bounding box. In 906, an attention tracker can maintain state information across video frames for one or more previously-detected people. For instance, the state information for a given previously-detected person can track a period of time that a frontal face has been detected for the given previously-detected person. In 908, the attention tracker can compare the period of time that the frontal face has been detected for the given previously-detected person against a threshold. The attention tracker can, in 910, output an attention event in response to determining that the period of time exceeds the threshold. In response to determining the period of time does not exceed the threshold, the method can return to 902 for further processing.

Figure 10:
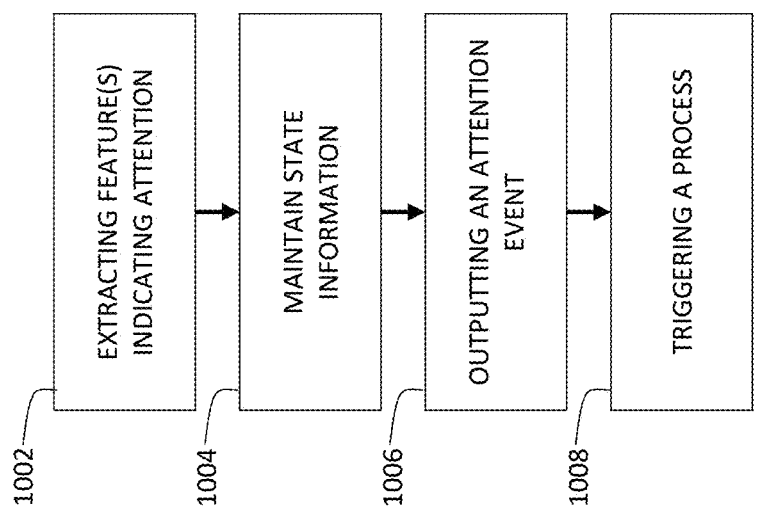
FIG. 10 is a flow diagram illustrating a method for vision-based far field attention detection, according to some embodiments of the disclosure.

FIG. 10 is a flow diagram illustrating a method for vision-based far field attention detection, according to some embodiments of the disclosure. In 1002, a far field frontal face detector can extract one or more features indicating attention in an area of a video frame associated with a user. In 1004, an attention tracker can maintain state information based on the one or more features across video frames. In 1004, the attention tracker can output an attention event for the user based on the state information. In 1004, a far field vision-based attention detector can trigger a process to be executed in a far field device in response to the attention event to facilitate interaction between the far field device and the user.

Figure 11:
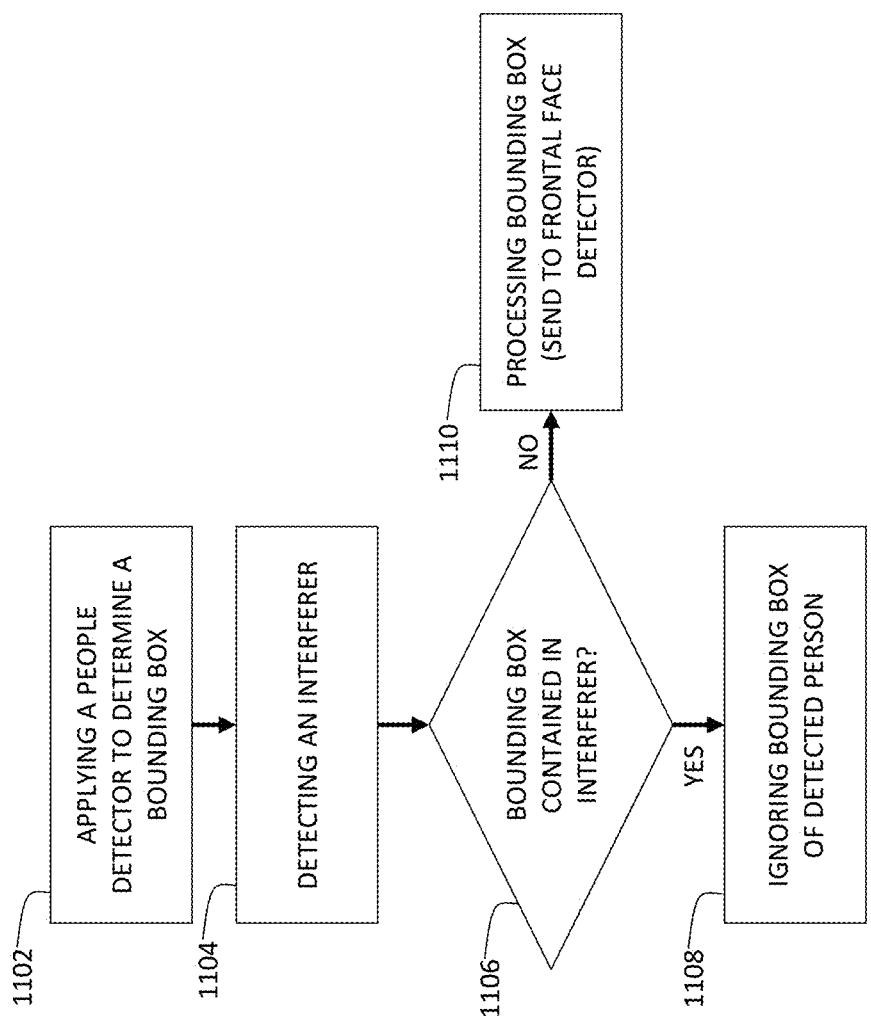
FIG. 11 is a flow diagram illustrating a method for interferer rejection in vision-based attention detection, according to some embodiments of the disclosure.

FIG. 11 is a flow diagram illustrating a method for interferer rejection in vision-based attention detection, according to some embodiments of the disclosure. In 1102, a people detector is applied to a video frame of a video stream to determine a bounding box of a detected person. In 1104, a vision-based interferer rejector can detect an interferer in the video stream. In 1106, the vision-based interferer rejector can check if the bounding box of the detected person is contained within a bounding box of the interferer. In 1108, in response to determining that the bounding box of the detected person is contained within a bounding box of the interferer, vision-based interferer rejector, a frontal face detector, and/or an attention tracker can ignore the bounding box of the detected person for attention detection processing. In 1110, in response to determining that the bounding box of the detected person is not contained within a bounding box of the interferer, vision-based interferer rejector, a frontal face detector, and/or an attention tracker can process the bounding box of the detected person for attention detection processing.

Figure 12:
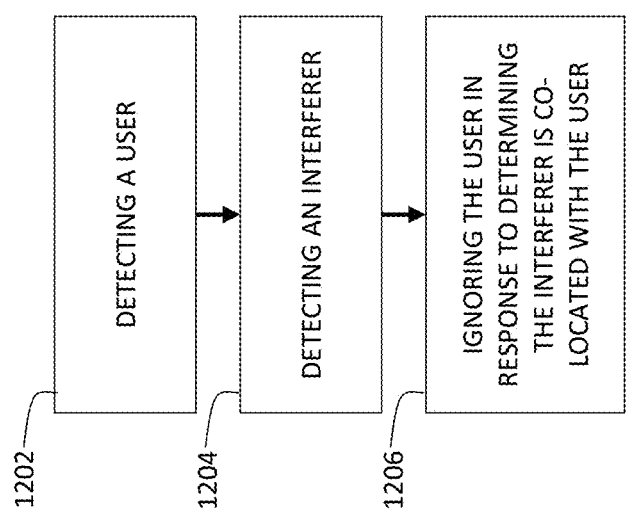
FIG. 12 is a flow diagram illustrating a method for interferer rejection in vision-based attention detection, according to some embodiments of the disclosure.

FIG. 12 is a flow diagram illustrating a method for interferer rejection in vision-based attention detection, according to some embodiments of the disclosure. In 1202, a people detector can detect a user in a video frame of a video stream. In 1204, a vision-based interferer rejector can detect an interferer in the video stream. In 1206, in response to determining that the interferer is co-located with the user, the vision-based interferer rejector can ignore the user for attention detection processing being executed by a far field device.

Figure 13:
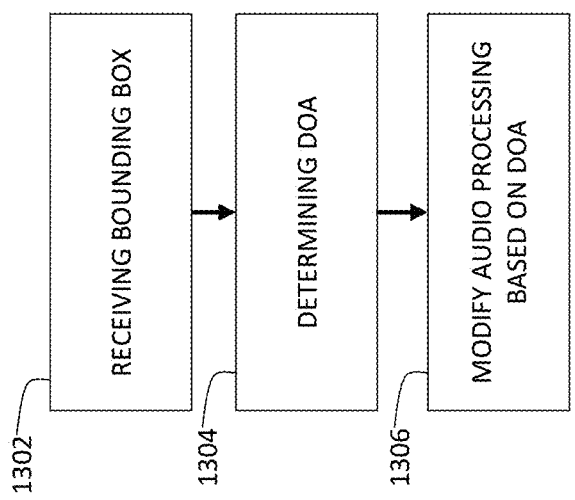
FIG. 13 is a flow diagram illustrating a method for vision-assisted audio processing, according to some embodiments of the disclosure.

FIG. 13 is a flow diagram illustrating a method for vision-assisted audio processing in a far field device, according to some embodiments of the disclosure. In 1302, a vision-based DOA estimation part receives a bounding box corresponding to an attentive person in a video frame of a video stream. In 1304, the vision-based DOA estimation part can determine a direction of arrival based on the bounding box. In 1306, the far field device can modify audio processing in the far field device based on the direction of arrival.

Figure 14:
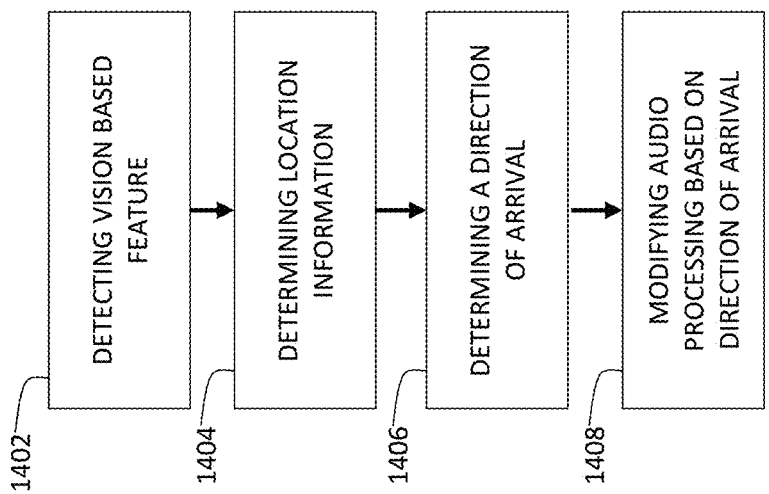
FIG. 14 is a flow diagram illustrating a method for vision-assisted audio processing, according to some embodiments of the disclosure.

FIG. 14 is a flow diagram illustrating a method for vision-assisted audio processing in a far field device, according to some embodiments of the disclosure. In 1402, a far field frontal face detector can detect a vision-based feature in a video frame indicating attention by a user. In 1404, a vision-based DOA estimation part can determining location information in the video frame corresponding to the vision-based feature. In 1406, the vision-based DOA estimation part can determine a direction of arrival based on the location information. In 1408, the far field device can modifying audio processing in the far field device based on the direction of arrival.

EXAMPLES

Example 1000 is a method for vision-based attention detection, the method comprising: detecting people in video frames, generating one or more bounding boxes of detected people in the video frames; detecting frontal faces in the one or more bounding boxes of detected people; and maintaining state information across frames for the detected people, wherein the state information tracks how long a frontal face has been detected.

Example 2000 is a method for vision-assisted audio processing, the method comprising: detecting frontal faces in video frames, generating one or more bounding boxes of detected people in the video frames, determining one or more directions of arrival based on the one or more bounding boxes; and modifying audio processing based on the one or more directions of arrival.

Example 1 is a method for vision-based attention detection, the method comprising: determining a bounding box of a detected person in a video frame; and detecting a frontal face in the bounding box; and maintaining state information across video frames for one or more previously-detected people, wherein the state information for a given previously-detected person tracks a period of time that a frontal face has been detected for the given previously-detected person.

In Example 2, the method of Example 1 can optionally include comparing the period of time that the frontal face has been detected for the given previously-detected person against a threshold, and outputting an attention event in response to determining that the period of time exceeds the threshold.

In Example 3, the method of Example 2 can optionally include initiating an audio process in response to outputting the attention event.

In Example 4, the method of any one of Examples 1-3 can optionally include resampling a first sub-image of the detected person extracted based on a first bounding box of the detected person by a resampling factor, prior to detecting the frontal face.

In Example 5, the method of Example 4 can optionally include determining the resampling factor based on a width and height of the first sub-image and a geometric relationship relating a face and a body.

In Example 6, the method of any one of Examples 1-5 can optionally include maintaining the state information comprising: maintaining a first list of one or more previously-detected bounding boxes and a second list of one or more attention event start time indicators corresponding to the one or more previously-detected bounding boxes in the first list.

In Example 7, the method of Example 6 can optionally include maintaining the state information comprising: determining whether the bounding box is already present in the first list.

In Example 8, the method of Example 7 can optionally include determining whether the bounding box is already present in the first list comprising: comparing the bounding box against each one of the previously-detected bounding box in the first list; and determining that the bounding box is already present in the first list in response to finding sufficient match between the bounding box and one of the one or more previously-detected bounding boxes.

In Example 9, the method of any one of Examples 6-8 can optionally include maintaining the state information comprising: adding the bounding box in the first list of one or more previously-detected bounding boxes in response to determining the bounding box is not already present in the list of one or more previously-detected bounding boxes.

In Example 10, the method of any one of Examples 6-9 can optionally include maintaining the state information comprising: adding the bounding box to the first list; and in response to detecting the frontal face in the bounding box, setting a current time as a value for an attention event start time indicator that corresponds to the bounding box in the second list.

In Example 11, the method of any one of Examples 6-10 can optionally include outputting an attention event in response to determining that a current time minus an attention event start time in the second list exceeds a threshold.

Example 12 is a method for interferer rejection in vision-based attention detection, comprising: applying a people detector to a video frame of a video stream to determine a bounding box of a detected person; detecting an interferer in the video stream; and in response to determining that the bounding box of the detected person is contained within a bounding box of the interferer, ignoring the bounding box of the detected person for attention detection processing.

In Example 13, the method of Example 12 can optionally include: in response to determining that the bounding box does not include the interferer, applying a frontal face detector to the bounding box to detect attention.

In Example 14, the method of Example 12 or 13 can optionally include maintaining a list of one or more detected interferers across video frames, wherein the list comprises one or bounding boxes of the detected interferers.

In Example 15, the method of any one of Examples 12-14 can optionally include maintaining state information across video frames for one or more previously-detected people, wherein the state information for a given previously-detected person tracks a starting time when feature indicating attention is detected for the given previously-detected person.

Example 16 is a method for vision-assisted audio processing for a far field device, the method comprising: receiving a bounding box corresponding to an attentive person in a video frame of a video stream; determining a direction of arrival based on the bounding box; and modifying audio processing in the far field device based on the direction of arrival.

In Example 17, the method of Example 16 can optionally include: detecting an interferer in the video stream; and in response to determining that the bounding box of the attentive person is contained within a bounding box of the interferer, reject audio coming from the direction of arrival.

In Example 18, the method of Example 15 or 16 can optionally include determining the direction of arrival comprising determining a steering vector corresponding to the direction of arrival; and modifying the audio processing comprising providing the steering vector to a beamformer.

In Example 19, the method of Example 18 can further optionally modifying the audio processing comprising: calculating optimum weights for each frequency based on the steering vector; and applying the optimum weights to audio signals to perform beamforming.

In Example 20, the method of any one of Examples 17-20 can optionally include modifying the audio processing comprising: calculating optimum weights for each frequency to nullify signals from the interferer; and applying the optimum weights to audio signals to perform beamforming.

Example 21 is a method for vision-based attention detection, the method comprising: extracting one or more features indicating attention in an area of a video frame associated with a user; maintaining state information based on the one or more features across video frames; outputting an attention event for the user based on the state information; and triggering a process to be executed in a far field device in response to the attention event to facilitate interaction between the far field device and the user.

In Example 22, the method of Example 21 can optionally include maintaining the state information comprising maintaining events associated with detection of different features for the user; and outputting the attention event for the user based on the state information comprising outputting the attention event in response to detecting a sequence of events in the state information.

In Example 23, the method of Example 21 or 22 can optionally include outputting the attention event for the user based on the state information comprising classifying the state information based on one or more criteria.

Example 24 is a method for interferer rejection in vision-based attention detection, comprising: detecting a user in a video frame of a video stream; detecting an interferer in the video stream; and in response to determining that the interferer is co-located with the user, ignoring the user for attention detection processing being executed by a far field device.

In Example 25, the method of Example 24 can optionally include detecting the interferer comprising determining a lack of features indicating attention in an area of the video frame where the user was detected.

In Example 26, the method of Example 24 or 25 can optionally include detecting the interferer comprising applying a classifier trained to detect classes of interferers to video frames of the video stream.

Example 27 is a method for vision-assisted audio processing for a far field device, the method comprising: detecting a vision-based feature in a video frame indicating attention by a user; determining location information in the video frame corresponding to the vision-based feature; determining a direction of arrival based on the location information; and modifying audio processing in the far field device based on the direction of arrival.

In Example 28, the method of Example 27 can optionally include detecting an interferer in the video stream; and wherein modifying the audio processing comprises, in response to determining that the vision-based feature is co-located the interferer, rejecting audio coming from the direction of arrival.

In Example 29, the method of Example 27 or 28 can optionally include determining the direction of arrival comprising determining a steering vector corresponding to the location information; and modifying the audio processing comprises providing the steering vector to a beamformer.

In Example 30, the method of any one of Examples 27-29 can optionally include calculating optimum weights for each frequency to nullify signals from the interferer; and applying the optimum weights to audio signals to perform beamforming.

Example 31 includes one or more non-transitory computer-readable media comprising one or more instructions, said instructions encoded in one or more non-transitory computer-readable media that when the instructions are executed by a processor operable to perform operations comprising any one or more methods described herein.

Example 31 is a far field device comprising one or more cameras, one or more memory elements for storing data and instructions, one or more processors, and one or more parts described herein executable on the one or more processors to implement any one or more methods described herein.

Variations and Implementations

In some cases, a depth camera can be available on the far field device 100. An example includes time-of-flight camera, stereo camera, etc. Depth information can provides an additional layer of information about person vs. image, etc., which could be used to improve the performance of the vision-based interferer rejector 292. Depth information may also be used to augment vision-based DOA estimation part 206 to improve the performance of the beamformer 110.

Besides processing for frontal faces, the far field vision-based attention detector 204 can be augmented with other vision-based schemes. One example includes vision-based classification or discrimination. The far field vision-based attention detector 204 can further include a vision-based classifier which can distinguish between a child and an adult (e.g., children are not allowed to shop by voice). The far field vision-based attention detector 204 can include a vision-based classifier or authentication system that can determine whether a detected person and/or a detected frontal face is a member or authenticated user. The classifier/authentication system can also implement user identification such that personalized actions can be performed. A recognition algorithm and/or training can be provided to carry out the authentication function. Depth information can be beneficial for improving the performance of these features.

Besides improving the beamformer, the vision-based schemes described herein can be used to augment and/or improve algorithms such as acoustic echo cancellation. If the vision-based schemes can infer the acoustic reflectors in the environment, the information can be used to estimate the impulse response of the surroundings better. Depth information can also be beneficial in such cases.

Parts of various apparatuses for providing multi-modal far field user interfaces can include electronic circuitry to perform the functions described herein. In some cases, one or more parts of the apparatus can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer medium.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the present disclosure. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to multi-modal far field user interfaces, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the disclosure. Note that all optional features of the apparatus described above may also be implemented with respect to the method or process described herein and specifics in the examples may be used anywhere in one or more embodiments.

What is claimed is:

1. A method for interferer rejection in vision-based attention detection, comprising:
applying a people detector to a video frame of a video stream, to determine a bounding box of a detected person;
detecting an interferer in the video stream, wherein the interferer is an inanimate stationary rectangular object; and
in response to determining that the bounding box of the detected person is contained within a bounding box of the interferer, ignoring the bounding box of the detected person for attention detection processing.

2. The method of claim 1, wherein:
detecting the interferer comprises determining a lack of features indicating attention in an area of the video frame where a person was detected.

3. The method of claim 1, further comprising:
detecting the interferer comprises applying a classifier trained to detect classes of interferers, to video frames of the video stream.

4. The method of claim 1, further comprising:
in response to determining that the bounding box does not include the interferer, applying a frontal face detector to the bounding box to detect attention.

5. The method of claim 1, further comprising:
maintaining a list of one or more detected interferers across video frames, wherein the list comprises one or more bounding boxes of the detected interferers.

6. The method of claim 1, further comprising:
maintaining state information across video frames for one or more previously-detected people, wherein the state information for a given previously-detected person tracks a starting time when feature indicating attention is detected for the given previously-detected person.

7. The method of claim 1, further comprising:
detecting a frontal face in the bounding box; and
maintaining state information across video frames for one or more previously-detected persons, wherein the state information for a given previously-detected person tracks a period of time that the frontal face has been detected for the given previously-detected person.

8. The method of claim 7, further comprising:
comparing the period of time that the frontal face has been detected for the given previously-detected person against a threshold; and
outputting an attention event in response to determining that the period of time exceeds the threshold.

9. A method for interferer rejection in vision-based attention detection, comprising:
detecting a user in a video frame of a video stream;
detecting an interferer in the video stream, wherein the interferer is an inanimate rectangular object; and
in response to determining that the interferer is co-located with the user, ignoring the user for attention detection processing being executed by a far field device.

10. The method of claim 9, wherein:
detecting the interferer comprises determining a lack of features indicating attention in an area of the video frame where the user was detected.

11. The method of claim 9, further comprising:
detecting the interferer comprises applying a classifier trained to detect classes of interferers to video frames of the video stream.

12. The method of claim 9, further comprising:
waking up the far field device based on the user looking at the far field device.

* * * * *